US011699453B2

United States Patent
Caroselli et al.

(10) Patent No.: US 11,699,453 B2
(45) Date of Patent: *Jul. 11, 2023

(54) ADAPTIVE MULTICHANNEL DEREVERBERATION FOR AUTOMATIC SPEECH RECOGNITION

(71) Applicant: Google LLC, Mountain View, CA (US)

(72) Inventors: Joseph Caroselli, Palo Alto, CA (US); Arun Narayanan, Santa Clara, CA (US); Izhak Shafran, Portland, OR (US); Richard Rose, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 17/005,823

(22) Filed: Aug. 28, 2020

(65) Prior Publication Data

US 2020/0395029 A1 Dec. 17, 2020

Related U.S. Application Data

(63) Continuation of application No. 16/032,996, filed on Jul. 11, 2018, now Pat. No. 10,762,914.

(Continued)

(51) Int. Cl.
*G10L 21/00* (2013.01)
*G10L 21/0208* (2013.01)
(Continued)

(52) U.S. Cl.
CPC .......... *G10L 21/0208* (2013.01); *G06F 3/167* (2013.01); *G06F 17/142* (2013.01);
(Continued)

(58) Field of Classification Search
CPC ............ G10L 21/0205; G10L 21/0232; G10L 21/0388; G10L 25/15; G10L 2021/02166;
(Continued)

(56) References Cited

U.S. PATENT DOCUMENTS 8,467,538 B2   6/2013   Nakatani et al.
9,390,712 B2   7/2016   Yu et al.
(Continued)

OTHER PUBLICATIONS

C. Lin, Y. Chen and Y. Wang, "Partial Update Adaptive Filtering Based on Head-Related Model for In-Vehicle Audio Enhancement," 2012 International Conference on Connected Vehicles and Expo (ICCVE), 2012, pp. 226-230. (Year: 2012).*

(Continued)

*Primary Examiner* — Edgar X Guerra-Erazo
(74) *Attorney, Agent, or Firm* — Gray Ice Higdon

(57) ABSTRACT

Utilizing an adaptive multichannel technique to mitigate reverberation present in received audio signals, prior to providing corresponding audio data to one or more additional component(s), such as automatic speech recognition (ASR) components. Implementations disclosed herein are "adaptive", in that they utilize a filter, in the reverberation mitigation, that is online, causal and varies depending on characteristics of the input. Implementations disclosed herein are "multichannel", in that a corresponding audio signal is received from each of multiple audio transducers (also referred to herein as "microphones") of a client device, and the multiple audio signals (e.g., frequency domain representations thereof) are utilized in updating of the filter—and dereverberation occurs for audio data corresponding to each of the audio signals (e.g., frequency domain representations thereof) prior to the audio data being provided to ASR component(s) and/or other component(s).

16 Claims, 6 Drawing Sheets

Related U.S. Application Data

(60) Provisional application No. 62/637,351, filed on Mar. 1, 2018.

(51) Int. Cl.

| | | |
|---|---|---|
| *G10L 15/20* | (2006.01) | |
| *G10L 15/22* | (2006.01) | |
| *G10L 15/065* | (2013.01) | |
| *G06F 3/16* | (2006.01) | |
| *G06N 3/02* | (2006.01) | |
| *G06F 17/14* | (2006.01) | |
| *G10L 15/06* | (2013.01) | |
| G10L 21/0216 | (2013.01) | |

(52) U.S. Cl.
CPC .............. *G06N 3/02* (2013.01); *G10L 15/063* (2013.01); *G10L 15/065* (2013.01); *G10L 15/20* (2013.01); *G10L 15/22* (2013.01); *G10L 2015/223* (2013.01); *G10L 2021/02082* (2013.01); *G10L 2021/02166* (2013.01)

(58) Field of Classification Search
CPC ........... G10L 2021/02082; H04R 3/005; H04S 7/305
See application file for complete search history.

(56) References Cited

U.S. PATENT DOCUMENTS

| | | |
|---|---|---|
| 9,697,826 B2 | 7/2017 | Sainath et al. |
| 10,170,134 B2 | 1/2019 | Markovich Golan et al. |
| 10,657,981 B1 * | 5/2020 | Mansour ................ H04R 3/005 |
| 10,762,914 B2 * | 9/2020 | Caroselli ................ G10L 15/22 |
| 2016/0118038 A1 | 4/2016 | Eaton et al. |
| 2016/0240210 A1 | 8/2016 | Lou |
| 2016/0322055 A1 | 11/2016 | Sainath et al. |
| 2016/0358619 A1 | 12/2016 | Ramprashad et al. |

OTHER PUBLICATIONS

Kuttruff, H.; Room acoustics. Crc Press; dated 2016.
Zelinski, R., A Microphone Array with Adaptive Post-Filtering for 1988.
Bees, D., et al.; "Reverberant Speech Enhancement Using Cepstral Processing," in Acoustics, Speech, and Signal Processing; ICASSP-91., International Conference on IEEE, pp. 977-980; dated 1991.
Yoshioka, T., et al.; "Making Machines Understand us in Reverberant Rooms: Robustness Against Reverberation for Automatic Speech Recognition," IEEE Signal Processing Magazine, vol. 29, No. 6, pp. 114-126, dated 2012.
Kinoshita, K., et al., et al; "The Reverb Challenge: A Common Evaluation Framework for Dereverberation and Recognition of Reverberant Speech," in Applications of Signal Processing to Audio and Acoustics (WASPAA), IEEE Workshop on IEEE, pp. 1-4; dated 2013.
Barker, J. et al; "The Third Chimespeech Separation and Recognition Challenge: Dataset, Task and Baselines," in Automatic Speech Recognition and Understanding (ASRU); IEEE Workshop on IEEE; pp. 504-511; dated 2015.
Delcroix, M., et al.; "Linear Prediction-Based Dereverberation With Advanced Speech Enhancement and Recognition Technologies for the Reverb Challenge," in Reverb Workshop, dated 2014.
Yoshioka, T., et al., "The ntt Chime-3 System: Advances in Speech Enhancement and Recognition for Mobile Multi-Microphone Devices," in Automatic Speech Recognition and Understanding (ASRU), Workshop on IEEE, pp. 436-443; dated 2015.
Miyoshi, M. et al.; "Inverse Filtering of Room Acoustics," IEEE Transactions on Acoustics, Speech, and Signal Processing, vol. 36, No. 2, pp. 145-152, dated 1988.
Yoshioka, T. and T. Nakatani, "Generalization of Multi-Channel Linear Prediction Methods for Blind Mimo Impulse Response Shortening," IEEE Transactions on Audio, Speech, and Language Processing; vol. 20, No. 10; pp. 2707-2720; dated Dec. 2012.
Barry, J. R., et al.; Digital Communication; New York: Springer; dated 2012.
Yoshioka, T. et al.; "Adaptive Dereverberation of Speech Signals with Speaker-Position Change Detection" in Proc. IEEE International Conference on Acoustics, Speech and Signal Processing (ICASSP) IEEE; pp. 3733-3736; dated 2009.
Diniz, P. S.; Adaptive Filtering: Algorithms and Practical Implementation. Norwell, MA, USA: Kluwer Academic Publishers; dated 2002.
Glorot, X., et al.; "Understanding the Difficulty of Training Deep Feedforward Neural Networks," in Proc. International Conference on Artificial Intelligence and Statistics AISTATS10); Society for Artificial Intelligence and Statistics; dated 2010.

\* cited by examiner

ADAPTIVE MULTICHANNEL DEREVERBERATION FOR AUTOMATIC SPEECH RECOGNITION

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text (or other semantic representation) and then processed. Also, for example, users can additionally or alternatively provide requests by providing textual (e.g., typed) natural language input. An automated assistant responds to a request by providing responsive user interface output, which can include audible and/or visual user interface output.

As mentioned above, many automated assistants are configured to be interacted with via spoken utterances. Spoken utterances are received at a client device via one or more microphones of the client device. For example, each microphone of the client device generates a corresponding audio signal that varies over time in dependence on sound(s) detected at the microphone. The audio signal(s) received via the microphone(s) (and/or frequency domain representations thereof) can be processed (at the client device and/or remote server device(s)) for one or more purposes, such as automatic speech recognition (e.g., converting audio signal(s) to text, phone(s), phoneme(s), and/or other semantic representation).

The client device(s) via which a user interacts with an automated assistant includes an assistant interface that provides, to a user of the client device, an interface for interacting with the automated assistant (e.g., receives spoken and/or typed input from the user, and provides appropriate audible and/or graphical responses), and that interfaces with one or more additional components that implement the automated assistant (e.g., remote server device(s) that process user inputs and generate appropriate responses).

Audio signal(s) that are received via microphone(s) of a client device (and/or frequency domain representations thereof) are often pre-processed prior to being further processed by automatic speech recognition (ASR) component(s) and/or other component(s). Pre-processing of the audio signal(s) (and/or frequency domain representations thereof) can include, for example, dereverberation. Dereverberation of audio data processes the audio data in an attempt to reduce or eliminate reverberation(s) present in the audio data.

Reverberation(s) are reflection(s) of a sound that are created when the sound is reflected off sound-reflective surface(s) of object(s) (e.g., walls, furniture, people), thereby causing reflection(s) of the sound to be created. Reverberation(s) can be present in an audio signal as a corresponding microphone can receive not only the wavefront arriving directly from the source of the sound (e.g., a human speaker) by the shortest path, but can also receive longer path reflection(s) of that wave-front from surrounding object(s). The longer path reflection(s) of a wave-front are time-delayed relative to the wave-front that arrives by the shortest path, and are typically reduced in amplitude relative to the wave-front that arrives by the shortest path. The reflection(s) of a sound in an audio signal generated by a microphone will be dependent on, for example, the size of the room (or other environment), the position and nature of sound-reflective surface(s), the position of the source of the sound, the position of the corresponding microphone, etc.

Although techniques exist for pre-processing audio data to mitigate reverberation (mitigation of reverberation is also referred to herein as "dereverberation"), such techniques can suffer from one or more drawbacks. For example, in pre-processing audio data that includes a spoken utterance, some techniques can require audio data for the entire spoken utterance to be obtained before dereverberation can be performed on the audio data. For instance, some techniques rely on value(s) for dereverberation (e.g., so called "tap" values), where the value(s) cannot be calculated until the audio data for the entire spoken utterance is received. Waiting for audio data for the entire spoken utterance to be obtained can lead to latency in dereverberation, and a resulting latency in use of dereverberated audio data for ASR and/or other purposes—thereby also causing latency in generating a response from an automated assistant (which can rely on the ASR in generating the response). As another example, some techniques can experience a degradation in performance when a source of audio (e.g., a human speaker) is non-stationary during the course a spoken utterance. With such techniques, this and/or other factor(s) can lead to a loss of meaningful audio in dereverberation, resulting in a dereverberated audio signal that cannot be properly processed by ASR component(s) and/or other component(s) to ascertain the true meaning of a spoken utterance. This can lead to poor performance of the ASR and, as a result, poor performance of one or more other automated assistant components that rely on output of the ASR.

SUMMARY

Implementations disclosed herein are directed to utilizing an adaptive multichannel technique to mitigate reverberation present in received audio signals, prior to providing corresponding audio data to one or more components for further processing, such as one or more automatic speech recognition (ASR) components of an automated assistant.

Implementations disclosed herein are "adaptive", in that they utilize a filter, in the reverberation mitigation, that is online and causal. This enables effective dereverberation to be performed on audio data that captures a spoken utterance, and to be performed on portions of the audio data prior to audio data for the entire spoken utterance being received. For example, one or more iterations of updating the filter can occur prior to the entire spoken utterance being spoken by a human speaker, and updated iteration(s) of the filter utilized in dereverberation of audio data that corresponds to portions of the spoken utterance—prior to the entire spoken utterance being spoken by the human speaker. Such online and causal filter techniques described herein can reduce latency in dereverberation (e.g., relative to non-causal techniques), and resultantly reduce latency in use of dereverberated audio data for ASR and/or other purposes—thereby also reducing latency in generating a response from an automated assistant (which can rely on the ASR in generating the response). Such online and causal filter techniques can additionally or alternatively enable adaptation of the filter to changes in a Room Impulse Response (RIR) during the course of a spoken utterance. Changes in RIR can occur during the course of a spoken utterance due to movement of a source of the spoken utterance (e.g., a human speaker) and/or movement of other environmental object(s).

Implementations disclosed herein are "multichannel", in that a corresponding audio signal is received from each of multiple audio transducers (also referred to herein as "microphones") of a client device, and the multiple audio signals (e.g., frequency domain and/or time domain representations thereof) are utilized in updating of the filter—and dereverberation occurs for audio data corresponding to each of the audio signals (e.g., frequency domain and/or time domain representations thereof) prior to the audio data being provided to ASR component(s) and/or other component(s). Utilization of multiple channels in updating of the filter can, for example, mitigate negative impact of spectral null(s) that may be present at a given time in audio signal(s) from a subset of (e.g. one of) the microphones, but not all microphones. In other words, while a spectral null may be present at one frequency in the audio signal from a first microphone at a given time, that may not be the case in the audio signal from additional microphone(s) at or near the given time. Accordingly, through utilization of multiple channels, the filter can be updated to reflect the frequency based on the audio signal(s) from the additional microphone(s), despite the spectral null for the frequency in the audio signal from the first microphone.

Audio data that has been dereverberated according to techniques described herein can be provided for ASR and/or other processing. For example, ASR can be performed on the dereverberated audio data by processing the dereverberated audio data over one or more trained acoustic models to generate one or more semantic representations of the dereverberated audio data. The semantic representation(s) can include, for example, phones, phonemes, and/or text. In implementations where the semantic representation(s) include text, the text can optionally be generated based on phones and/or phonemes generated directly based on processing using a trained acoustic model. A trained acoustic model can be, for example, a neural network model such as neural network model including one or more long short-term memory (LSTM) layers, and trained based on a large corpus of audio data. In some implementations, the trained acoustic model can be trained, in whole or in part, on training audio data that is not dereverberated. In those implementations, use of dereverberated audio data (dereverberated according to techniques described herein) with the trained acoustic model can still result in measurable improvements in accuracy and/or robustness of ASR. In some implementations, the trained acoustic model can be trained, in whole or in part, on training audio data that is dereverberated according to techniques described herein. In some of those implementations, use of dereverberated audio data (dereverberated according to techniques described herein) with the acoustic model trained based on dereverberated audio data can result in further measurable improvements in accuracy and/or robustness of ASR. Accordingly, utilization of techniques described herein can result in more robust and/or more accurate detections of features of streams of audio data in various situations, such as environments with reverberation of an audio source due to room acoustics.

In some implementations, techniques described herein are implemented in combination with an automated assistant. For example, audio data that has been dereverberated according to techniques described herein can be provided to an ASR component and/or other component of an automated assistant, and further processing performed based on the dereverberated audio data. Output of the further processing can be utilized to adapt functionality of the automated assistant. For example, further processing performed by an ASR component of the automated assistant can be utilized to determine text that corresponds to a spoken utterance captured in the audio data, and such text utilized by the automated assistant in generating an appropriate audio and/or visual response to the spoken utterance.

In some implementations, dereverberation of audio data according to techniques described herein is performed by one or more processors of a client device that includes the microphones on which the audio data is based. In some of those implementations, the ASR and/or other components to which the dereverberated audio data is provided can be implemented by one or more of the client device processors and/or by processor(s) of remote server(s). For example, in some of those implementations, the dereverberated audio data is transmitted to one or more remote server(s) that perform ASR based on the dereverberated audio data.

Implementations of reverberation mitigation described herein utilize a weighted prediction error (WPE) technique to mitigate reverberations from audio data, while maximizing the meaningful portion(s) of the audio data (e.g., the shortest path portions of audio from source(s)). More particularly, implementations utilize a WPE technique that is adaptive, and that can be utilized with multiple channels of audio data from a microphone array.

Reverberation is generally modeled as the convolution of a room impulse response (RIR) with an original source signal. Particularly when an audio source is speech, such as when a user is providing voice commands to an automated assistant, the speech is correlated because each sound from the audio source occupies a non-instant amount of time. Further, each word, syllable, and/or phrase has some relation to preceding and/or proceeding sounds. Because speech is correlated, it can be beneficial that an adaptive reverberation filter be adapted in a manner to ensure that the resulting dereverberated audio data will be meaningful when provided to one or more other components, such as a speech-to-text module and/or other ASR module(s). Thus, implementations described herein can effectively ignore correlations that occurred less than a threshold time before a frame that is currently being filtered using an adaptive reverberation filter. For example, implementations described herein can update the adaptive reverberation filter at a given iteration using only audio data that occurred at least a threshold time before a frame that is to be filtered with the updated adaptive reverberation filter. For instance, for a current frame that is to be filtered, the adaptive reverberation filter can be updated based on frames that occurred at least n frames before the current frame, where n is greater than 1 (e.g., n can be 2, 3, 4, or 5). Accordingly, one or more frames that immediately precede a given frame being dereverberated may not be utilized to update the adaptive reverberation filter used in the dereverberation, thereby maintaining correlation (in the dereverberated audio data) between the given frame and the immediately preceding frame(s).

Implementations described herein can additionally or alternatively compensate for the variation in the power of the desired source signal during an utterance. Variation in the power of the source signal can occur as a result of the source of the source signal being non-stationary during the utterance (i.e., the source signal can be stronger when the source is closer to the microphones and weaker at a greater distance) and/or as a result of other object(s) in the environment moving during the utterance. Thus, implementations described herein can seek to maximize the ratio of source signal to reverberation to mitigate the risk of a source signal inadvertently being filtered out of the resulting processed audio stream.

As mentioned above, implementations described herein can additionally or alternatively mitigate negative impact of spectral null(s) that may be present at a given time in audio signal(s) from a subset of (e.g. one) the microphones, but not all microphones. By utilizing multiple channels, as described herein, the deleterious effect of spectral nulls may be mitigated. A spectral null is a portion of an audio stream that does not include information for a particular frequency for the given time and can occur when all information is filtered out after processing. In some instances, spectral nulls occur as a result of destructive interference between channels of a multi-channel device (e.g., echoes from one channel cancel the audio data in a different channel). Further, because each microphone of a microphone array receives a slightly different signal due to its unique distance from the source and any reflective surfaces, while a spectral null may be present at one frequency in the audio signal from a first microphone at a given time, that may not be the case in the audio signal from additional microphone(s) at or near the given time. Accordingly, through utilization of multiple channels, audio data for additional microphone(s) can reflect meaningful audio feature(s) absent from audio data for the first microphone (due to the spectral null). Such meaningful audio feature(s) can be used in ASR and can lead to improved performance of the ASR (relative to ASR based on a single channel with a spectral null). Moreover, an adaptive dereverberation filter can be updated to reflect the frequency based on the audio data from the additional microphone(s), despite the spectral null for the frequency in the audio data from the first microphone. This enables effective mitigation of reverberation(s) of the frequency that are present in subsequent portion(s) of the audio data.

The above is provided as an overview of some implementations disclosed herein. Further description of these and other implementations is provided below.

In some implementations, a method performed by one or more processors is provided that includes: receiving a plurality of audio signal streams, wherein each of the audio signal streams is based on output from a corresponding one of a plurality of microphones of a client device that implements an automated assistant interface of an automated assistant. At each of a plurality of iterations during a spoken utterance of a user that is detected at the plurality of microphones and that influences the audio signal streams, the method includes: converting most recent unprocessed portions of the audio signal streams into corresponding frequency domain representations, updating a multi-microphone adaptive reverberation filter utilizing the corresponding frequency domain representations of the audio signal streams for at least one prior iteration of the plurality of iterations, utilizing the updated multi-microphone adaptive reverberation filter in generating reverberation mitigated versions of the corresponding frequency domain representations for the most recent unprocessed portions of the audio signal streams, and providing the reverberation mitigated versions of the corresponding frequency domain representations for further processing by at least one additional component of the automated assistant.

These and other implementations of technology disclosed herein may optionally include one or more of the following features.

In some implementations, converting the most recent unprocessed portions of the audio signal streams into corresponding frequency domain representations further includes applying a fast Fourier transform to each of the unprocessed portions of the audio signal streams to generate the corresponding frequency domain representations of the most recent unprocessed portions of the audio signal streams. In some of those implementations, the corresponding frequency domain representations can each comprise corresponding values for a plurality of frequency bins.

In some implementations, updating the multi-microphone adaptive reverberation filter utilizing the corresponding frequency domain representations of the audio signal streams for at least one prior iteration of the plurality of iterations includes updating the multi-microphone adaptive reverberation filter utilizing the corresponding frequency domain representations of the audio signal streams for an immediately preceding iteration of the plurality of iterations.

In some implementations, at a given iteration, updating the multi-microphone adaptive reverberation filter utilizing the corresponding frequency domain representations of the audio signal streams for at least one prior iteration of the plurality of iterations further includes updating the multi-microphone adaptive reverberation filter utilizing the corresponding frequency domain representations of the audio signal streams for a prior iteration that is at least N iterations prior to the given iteration, and wherein N is greater than one.

In some implementations, the updated multi-microphone adaptive reverberation filter and the corresponding frequency domain representations for the most recent unprocessed portions of the audio signal streams can be each a corresponding matrix, and utilizing the updated multi-microphone adaptive reverberation filter in generating the reverberation mitigated versions of the corresponding frequency domain representations for the most recent unprocessed portions of the audio signal streams can include: generating a conjugate transpose of the multi-microphone adaptive reverberation filter; and generating the reverberation mitigated version of the corresponding frequency domain representations for the most recent unprocessed portions of the audio signal streams based on subtracting, from the corresponding frequency domain representations, a given matrix that is based on the conjugate transpose of the multi-microphone adaptive reverberation filter.

In some implementations, the further processing includes performing automatic speech recognition and the additional component comprises an automatic speech recognition component. In some of those implementations, the automatic speech recognition component can utilize a trained acoustic model in performing the automatic speech recognition. In some of those instances, in performing the automatic speech recognition, the automatic speech recognition component can utilize the trained acoustic model in processing the reverberation mitigated versions of the corresponding frequency domain representations, for a plurality of the iterations, to generate a semantic representation of the reverberation mitigated versions of the corresponding frequency domain representations, for a plurality of the iterations. The semantic representation may comprise text. In some of those instances, the trained acoustic model can be trained based at least in part on training audio data that is not dereverberated. In other instances, the trained acoustic model can be trained based at least in part on training audio data that is dereverberated.

These and other implementations of technology disclosed herein may optionally include one or more of the following features.

In some implementations, another method performed by one or more processors is provided that includes: receiving, during the spoken utterance, at least: a first stream of first channel audio data frames and a second stream of second channel audio data frames, the first stream of the first channel audio data frames being based on output from a first microphone of a client device and the second stream of the second channel audio data frames being based on output from a second microphone of the client device. Prior to completion of the spoken utterance, the method includes: updating a multi-microphone adaptive reverberation filter using both a first subset of one or more of the first channel audio data frames of the first stream and a second subset of one or more of the second channel audio data frames of the second stream, identifying a given first frame of the first channel audio data frames, and a given second frame of the second channel audio data frames, the given first frame and the given second frame received subsequent to the first subset and the second subset, using the updated multi-microphone adaptive reverberation filter in mitigating reverberation in the given first frame and the given second frame; and performing automatic speech recognition based on the reverberation mitigated given first frame and given second frame.

These and other implementations of technology disclosed herein may optionally include one or more of the following features.

In some implementations, the first stream of the first channel audio data frames can be frequency domain representations of a corresponding first channel audio signal stream of the first microphone, and wherein the second stream of the second channel audio data frames are frequency domain representations of a corresponding second channel audio signal stream of the second microphone.

In some implementations, the performing of the automatic speech recognition can include utilizing a trained acoustic model in processing the reverberation mitigated given first frame and given second frame, in generating a semantic representation of the spoken utterance. In some of those implementations, the trained acoustic model can be trained based at least in part on training audio data that is not dereverberated.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
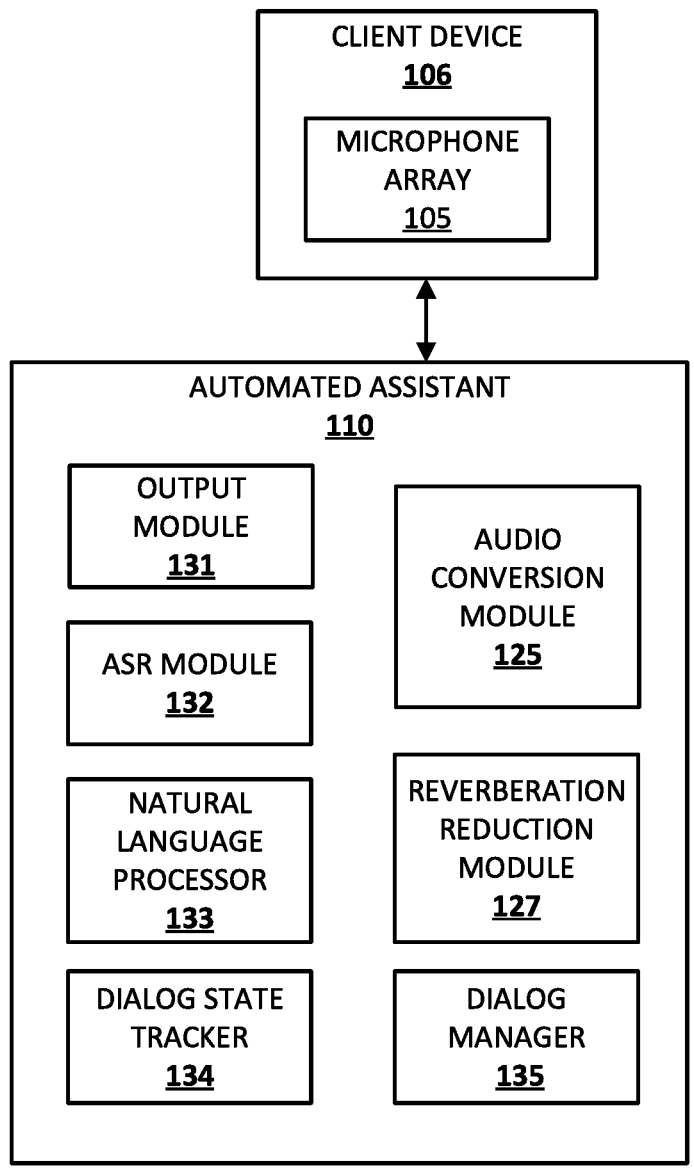
FIG. 1 is a block diagram of an example environment in which implementations disclosed herein can be implemented.

Now turning to FIG. 1, an example environment in which techniques disclosed herein can be implemented is illustrated. The example environment includes a client device 106 and an automated assistant 110. Although automated assistant 110 is illustrated in FIG. 1 as separate from client device 106, it is understood that one or more modules and/or aspects of the automated assistant 110 can be implemented, in whole or in part, by client device 106. For example, in some implementations a first set of modules and/or aspects are implemented by one or more processors of the client device 106, and a second set of modules and/or aspects are implemented by one or more processors of remote server device(s) that are in network communication with the client device 106. The remote server device(s) can be, for example, a cluster of high performance remote server device(s) that handle requests from the client device 106, as well as requests from additional (unillustrated) client devices. As one non-limiting example, the client device 106 can implement at least audio conversion module 125 and reverberation reduction module 127 of automated assistant 110 to generate dereverberated audio data. Continuing with the example, the client device 106 can transmit the dereverberated audio data to remote server device(s) that implement an automatic speech recognition (ASR) module 132 that processes the dereverberated audio data to generate semantically meaningful representations of the dereverberated audio data.

The client device 106 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

Automated assistant 110 engages in human-to-computer dialog sessions with a user via user interface input and output devices of the client device 106. One such example of an output device is speaker(s) of the client device 106, and one such example of a user interface input device is microphone array 105 of client device 106. For example, a user can provide user interface input directed to the automated assistant 110 by speaking spoken utterances that are detected by the microphone array 105. The microphone array 105 includes a plurality of microphones, each configured to detect audio in the environment and generate a corresponding audio signal stream as output. The audio signal stream generated by a given microphone of the microphone array 105 will vary over time in dependence on the audio detected at the given microphone. As one non-limiting example, the microphone array 105 can include two microphones positioned a fixed distance apart, and each of the two microphones can independently detect audio in the environment and can each generate a respective audio signal stream based on its detections. Each microphone in the microphone array 105 may include hardware and/or software components to convert detected audio into a respective audio signal stream.

The automated assistant includes an output module 131, an automated speech recognition (ASR) module 132, a natural language processor 133, a dialog state tracker 134, a dialog manager 135, an audio conversion module 125, and a reverberation reduction module 127. In some implementations, one or more of the engines and/or modules of automated assistant 110 may be omitted, combined, and/or implemented in a component that is separate from automated assistant 110. Also, in some implementations automated assistant 110 can include additional and/or alternative engines and/or modules. Further, as mentioned above, each of the engines and/or modules of automated assistant 110 can be implemented in whole or in part at the client device 106, and/or in whole or in part in remote server device(s).

The ASR module 132 processes audio data (that has been dereverberated by reverberation reduction module 127) over one or more trained acoustic models to generate one or more semantic representations of the dereverberated audio data. The semantic representation(s) can include, for example, phones, phonemes, and/or text. In implementations where the semantic representation(s) include text, the ASR module 132 can include a speech-to-text (STT) module that can optionally generate the text based on phones and/or phonemes generated directly based on processing using a trained acoustic model. A trained acoustic model can be, for example, a neural network model including one or more long short-term memory (LSTM) layers, and trained based on a large corpus of audio data.

As described in more detail below, the automated assistant 110 can utilize semantic representation(s) generated by ASR module 132 in generating responsive output from the automated assistant 110. For example, where audio data captures a spoken utterance of a user, the ASR module 132 can generate a text representation of the spoken utterance, and the automated assistant 110 can generate responsive audible and/or graphical output to provide that is responsive to the spoken utterance, and that is determined based on the spoken utterance. The output module 131 causes the responsive output to be rendered (e.g., audibly and/or graphically) at the client device 106. In some implementations, the responsive output can include textual data and the output module 131 can include a text-to-speech (US) module that converts textual data (e.g., natural language responses formulated by automated assistant 110) into computer-generated audio data. The output module 131 can cause the computer-generated audio data to be rendered via one or more speakers of the client device 106.

In some implementations, in generating responsive output from the automated assistant 110, the semantic representation(s) generated by ASR module 132 are provided to natural language processor 133, dialog state tracker 134, dialog manager 135, and/or other components of the automated assistant 110.

Natural language processor 133 (alternatively referred to as a "natural language understanding engine") of automated assistant 110 processes free-form natural language input and generates, based on the natural language input, annotated output for use by one or more other components of the automated assistant 110. For example, the natural language processor 133 can process natural language free-form input that is textual input that is a conversion, by ASR module 132, of audio data provided by a user via client device 106. The generated annotated output may include one or more annotations of the natural language input and optionally one or more (e.g., all) of the terms of the natural language input.

In some implementations, the natural language processor 133 is configured to identify and annotate various types of grammatical information in natural language input. For example, the natural language processor 133 may include a part of speech tagger (not depicted) configured to annotate terms with their grammatical roles. Also, for example, in some implementations the natural language processor 133 may additionally and/or alternatively include a dependency parser (not depicted) configured to determine syntactic relationships between terms in natural language input.

In some implementations, the natural language processor 133 may additionally and/or alternatively include an entity tagger (not depicted) configured to annotate entity references in one or more segments such as references to people (including, for instance, literary characters, celebrities, public figures, etc.), organizations, locations (real and imaginary), and so forth. The entity tagger of the natural language processor 133 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 133 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 133 may rely on annotations from one or more other components of the natural language processor 133. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 133 may use related prior input and/or other related data outside of the particular natural language input to determine one or more annotations.

In some implementations, dialog state tracker 134 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 135 may be configured to map a current dialog state, e.g., provided by dialog state tracker 134, to one or more "responsive actions" of a plurality of candidate responsive actions that are then performed by automated assistant 110. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 110 outputting additional natural language dialog. This responsive dialog may include, for instance, requests that the user provide parameters for some action (i.e., fill slots) that dialog state tracker 134 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

The audio conversion module 125 receives a plurality of audio signal streams and converts the audio signal streams into corresponding frequency domain representations. The audio signal streams are received from the microphones of the microphone array 105 of the client device 106. For example, audio conversion module 125 may receive audio signal streams that includes a first channel audio signal stream received from a first microphone of the microphone array 105 and a second channel audio signal stream that is received from a second microphone of the microphone array 105. The audio conversion module 125 can continuously process the first channel audio signal stream and continuously convert the first channel audio signal stream into a corresponding first stream of frequency domain audio data frames. Likewise, the audio conversion module 125 can continuously process the second channel audio signal stream and continuously convert the second channel audio signal stream into a corresponding second stream of frequency domain audio data frames.

In some implementations, in converting a portion of an audio signal stream into a frequency domain representation, the audio conversion module 125 applies a fast Fourier transform (FFT) to the portion of the audio signal stream to generate a frequency domain representation of the portion of the audio signal stream. For example, in generating a stream of frequency domain audio data frames for a channel, the audio conversion module 125 can iteratively apply an FFT to a most recently unprocessed portion of an audio signal stream for the channel. For instance, at a given iteration an X millisecond portion of the audio signal stream can be processed using the FFT to generate a frequency domain audio data frame, at a next iteration the next X millisecond portion of the audio signal stream can be processed using the FFT to generate a next frequency domain audio data frame, etc.

As the audio conversion module 125 processes the audio signal streams into frequency domain audio data frames, the audio data frames can be provided to the reverberation reduction module 127, which determines and applies a multichannel adaptive reverberation filter to the audio data frames. The reverberation reduction module 127 uses the multichannel adaptive reverberation filter to generate reverberation mitigated versions of the audio data frames. As described, the audio data frames provided to the reverberation reduction module 127 include multiple channels from the microphone array 105. As an example, assuming microphone array 105 includes i microphones, the audio data frames can be modeled as:

$$y_i[n]=h_i[n]*x[n] \quad (1)$$

In this instance, x[n] is the source signal and $y_i[n]$ is the signal received at the $i^{th}$ microphone at time n. Convolving with the finite impulse response (FIR), represented by $h_i[n]$, results in the summation of delayed and attenuated versions of all past source signals arriving at the $i^{th}$ microphone at time n after being reflected off of surface(s) before arriving at the microphone. As a working example, suppose an array includes two microphones spaced a distance apart. Each of the microphones may receive the same intended source signal x[n] via a direct line-of-sight path. Further, each microphone may receive waves that are the source signal reflected off of surface(s). However, because the microphones in the array are at different locations, each may receive the waves at different times relative to the source signal. For example, referring to FIG. 2, two microphones 205 and 210 are provided. The first microphone 205 and the second microphone 210 each receive the source signal 200 at nearly identical times. However, the source signal 200 also is reflected off of wall 215, thus resulting in delayed signal 220. Because microphone 205 is closer to wall 215, it will receive the reflected delayed signal 220 sooner than will microphone 210. Further, because each microphone occupies a slightly different location, even the source signal 200 may be received by the microphones at slightly different times.

Figure 2:
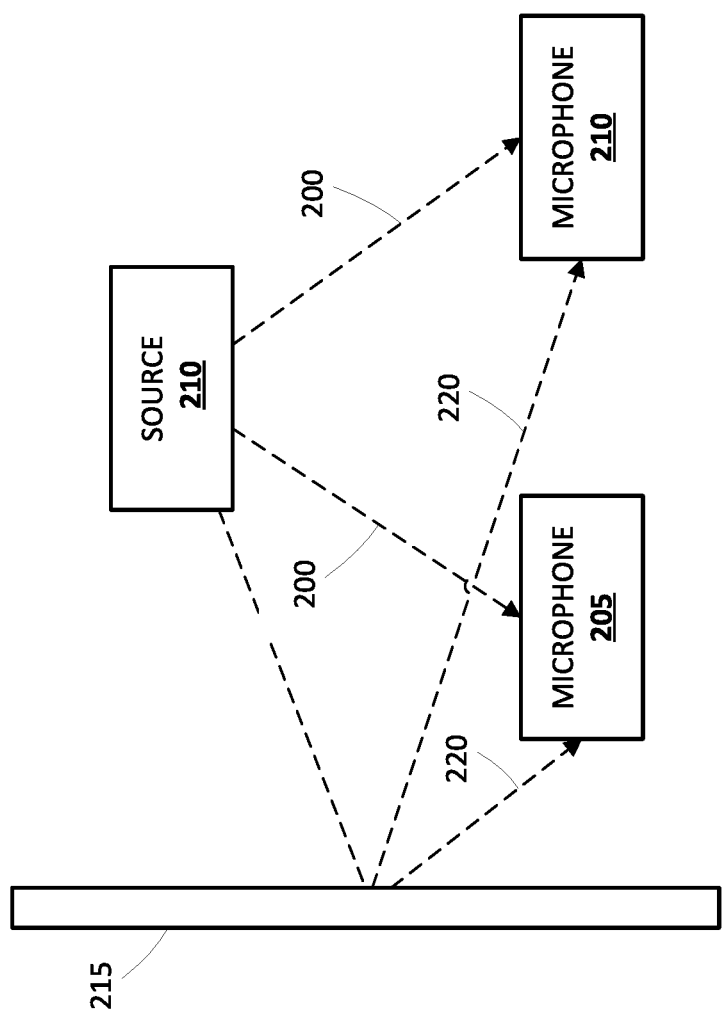
FIG. 2 illustrates a two-microphone array, an audio source, and an example of reverberation.
Figure 3:
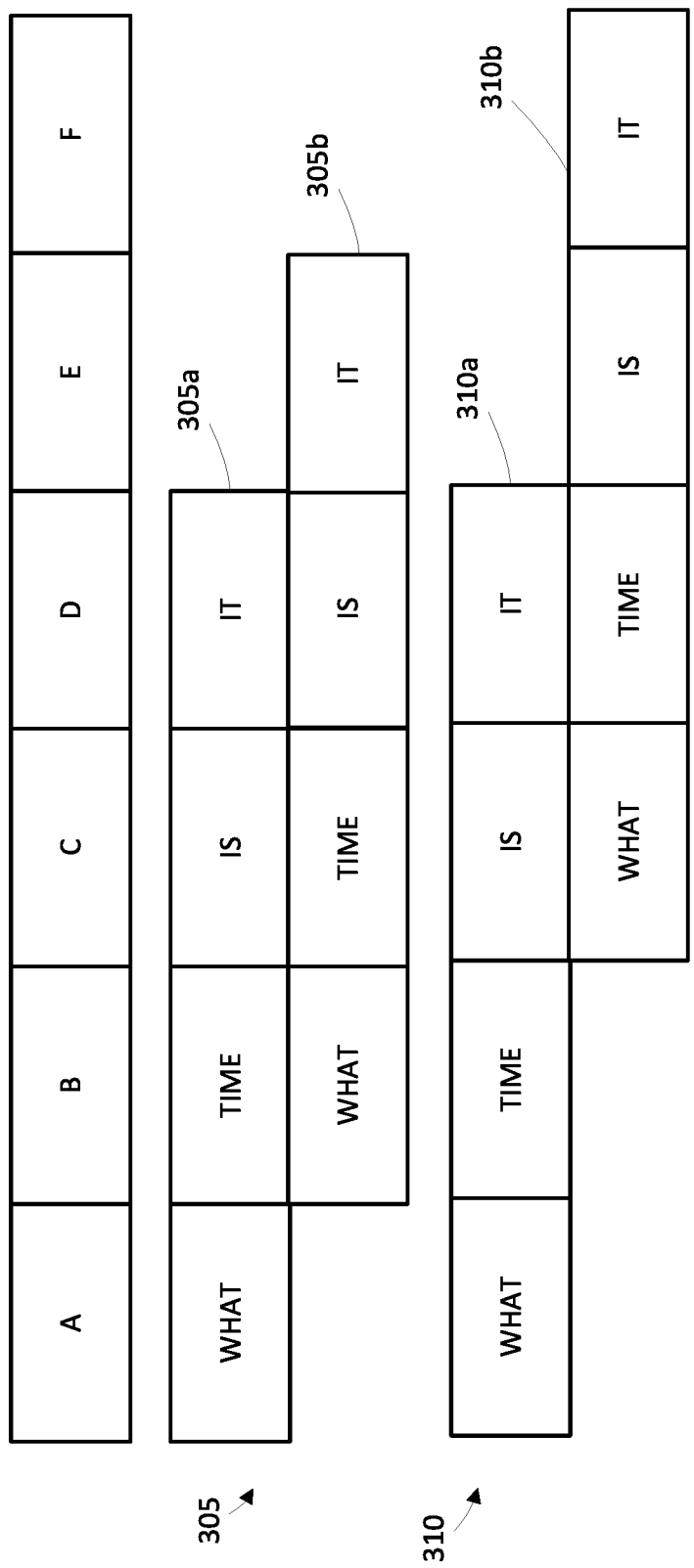
FIG. 3 illustrates an example of two streams of audio data frames with reverberation.

Continuing the same example from FIG. 2 and referring to FIG. 3, a stream of audio data frames 305 from microphone 205 and a stream of audio data frames 310 from microphone 210 is provided. As shown, the uttered phrase "What time is it?" is received by both microphones twice. For simplicity purposes, each word in FIG. 3 is shown as being wholly contained in a single frame. However, in many situations, a given frame will include audio data corresponding to only a portion of a word, such as a phone or phoneme that corresponds to a portion of a word. Moreover, in many situations, a given frame will not include any audio data corresponding to a word (e.g., during a moment of silence) or may just include noise. Each microphone receives frames that include the original source signal (305a and 305b) and a reflected version (305b and 310b) of the source signal, with the original source signal being a direct line-of-sight path from the source to the microphones (i.e., non-reverberated). The reflected versions 305b and 310b are received at later times than the original source signals 305a and 305b due to being reflected—and can also be of a lesser intensity due to being reflected. Further, the reflected version 310b is received at a later time than the reflected version 305b due to, for example, the distance between the microphones. Thus, the received audio signal is different for each of the microphones yet the same audio information is received with time and amplitude variations of a portion of the stream. For example, for audio stream 305, audio for the term "What" is received at frame A and further, the reverberated signal for "What" is received in frame B along with the source stream audio for the term "Time." For stream 310, because the microphone 210 is farther from the wall 215 in FIG. 2, the delay between the source signal and the reverberation is greater (i.e., "What" is instead received at frame C).

Audio conversion module 125 receives an audio signal from each of the microphones of array 105 that includes the original source signal convolved with an impulse response, which results in a sum of all delayed and weakened versions of the source signal. Because the impulse response for an audio data frame includes reflected versions of the source signal previously received by the microphone, the portion identified as being received previously by the microphone (as the source signal) may be mitigated from any future frames because, in the future frame, that portion of the signal is no longer the source signal but instead a reverberation or echo.

Returning to the previous example and referring again to FIG. 3, the audio signal received by each microphone is divided into sample frames A, B, C, etc. In order to remove the reflection in frame C of the audio stream 310 of microphone 210, the portion of source signal 310a from frame A is identified and utilized to update an adaptive reverberation filter that is then utilized in mitigating reverberation from frame C. Thus, the "What" that was identified in frame A as the original source signal 310a is removed from frame C (i.e., as part of the reverberation portion of the signal 310b) to mitigate the reverberation at frame C. Although single reverberations of terms are illustrated in FIG. 3, in some implementations, subsequent frames may include additional reverberations of the source signal (e.g., another reverberation of "What" in frame F). Thus, the filter may be updated in a recursive manner to continue to mitigate the reverberation of "What" in future processed frames.

In order to retain correlation information in the processed audio, techniques described herein can optionally ignore correlations that are shorter than a threshold of correlation. For example, referring again to FIG. 3, the correlation between the original signal 305a and the reverberation 305b is one frame for microphone 205, whereas the original signal and the reverberation are two frames apart for microphone 210 (310a and 310b respectively). In some implementations, the adaptive filter may not mitigate the reverberation of microphone 205 because doing so may remove frequency information that is important for ASR applications, but may mitigate the reverberation illustrated for audio stream 310.

The audio data frames for each of the microphones (k, in the above equations), may include, for a given frame for each of the microphones, multiple reverberations of the original audio source. For example, additional walls may be present to reflect the source signal and therefore audio data frame(s) at a given time may include a portion of each of a multiple of reverberations of the audio source. The above equations selectively processes only that part of the audio stream where the delay in signal received at each of the microphones 105 exceeds a threshold. Thus, if the frame in which a portion of audio stream is received at each microphone of the array 105 does not exceed a threshold delay time, that portion of the audio signal will not be filtered out of the processed audio to protect correlation of the rest of the stream. Further, to compensate for the variation in the power of the desired source signal, the ratio of source signal to reverberation can be maximized to better ensure that source signal is not filtered out of the resulting processed audio stream.

In some implementations, spectral nulls in processed audio streams may be compensated for due to the multi-channel microphone array 105. A "spectral null" is defined as a frequency of an audio stream where, for a frame, no frequency information is available for a particular frequency range (or frequency bin). Spectral nulls are a common occurrence in multipath channels, where several different channel paths due to reflections can combine in a negative manner at certain frequencies. Multiple microphones and multiple data streams better ensure that the resulting processed audio includes all meaningful information from the original signal source. Thus, for a given audio frame where a spectral null has been introduced, one or more frames from an alternative stream may include the frequency information and may be utilized to process subsequent frames. An audio data frame that is a frequency representation is often represented as values for each of a plurality of frequency bins (F). For example, for a given portion of an audio signal, the audio signal can be converted into an audio data frame that includes 512 frequency bins. If a bin for a stream is null for a particular frame, one or more of the other streams (i.e., a frame from a stream of a different microphone) may not be null for that frequency for the same portion of the audio stream and thus may be utilized to determine frequency information for that time frame and/or may be utilized to update the filter so that those frequencies are filtered out of subsequent frames as unwanted reverberation.

While dereverberation could be performed in the time domain, the filtering in this implementation is done in the frequency domain as represented by $$\hat{Y}_{i,l}[n]=Y_{i,l}[n]-\Sigma_{m=0}^{M-1}\Sigma_{k=0}^{N'-1}\hat{W}_{i,m,l}^*[k]Y_{m,l}[n-k-\Delta] \quad (2)$$

where i represents the channel being dereverberated. $Y_{i,l}[n]$ represents the $n^{th}$ frame of the ST-DFT of subband l for the incoming signal from channel i, $\hat{W}_{i,m,l}[k]$ is the $k^{th}$ filter tap applied to the $l^{th}$ subband of the $m^{th}$ input channel to produce the $i^{th}$ channel of dereverberated output and $\hat{Y}_{i,l}[n]$ represents the $n^{th}$ frame of the ST-DFT of the $l^{th}$ subband for the processed signal from channel i. M is the number of inputs from microphones and N is the filter length.

In order to retain correlation information in the processed audio, techniques described herein can optionally ignore correlations that are shorter than a threshold of correlation. This is accomplished with the delay A is equation (x). For example, referring again to FIG. 3, the correlation between the original signal 305a and the reverberation 305b is one frame for microphone 205, whereas the original signal and the reverberation are two frames apart for microphone 210 (310a and 310b respectively). In some implementations, the adaptive filter may not mitigate the reverberation of microphone 205 because doing so may remove frequency information that is important for ASR applications, but may mitigate the reverberation illustrated for audio stream 310.

Combining all channels i=0, 1, . . . M from equation (x) using matrix notation $$\hat{Y}_l[k]=Y_l[k]-\hat{W}_l^H\tilde{Y}_l \quad (3)$$

In Equation 3, l represents the frequency bin, k represents the short-time discrete Fourier transform frame index, and $Y_l[k]$ is a M×1 vector that contains the $k^{th}$ frame of the $l^{th}$ subband of the short-time discrete Fourier transform of the received signal for each of the multiple microphones.

$$\hat{Y}_l[n]=[\hat{Y}_{0,l}[n]\hat{Y}_{1,l}[n] \ldots \hat{Y}_{M-1,l}[n]]^T \quad (4)$$

is a M×1 vector.

$$\tilde{Y}_l[n]=[\tilde{Y}_{0,l}\tilde{Y}_{1,l} \ldots Y_{M-1,l}]^T \quad (5)$$

is a MN×1 vector where $$\widetilde{Y_{i,l}}[n]=[Y_{i,l}[n-\Delta] \ldots Y_l[n-\Delta-(N'-1)]] \quad (6)$$

The tap matrix of size MN×M is defined as $$W_l = [w_0^T w_1^T \ldots w_{i,M-1}] \quad (7)$$

where $$w_i = [w_{i,0} w_{i,1} \ldots w_{i,M-1}] \quad (8)$$

and $$w_{i,j} = [W_{i,j}[0] w_{i,j}[1] \ldots w_{i,j}[N'-1]]. \quad (9)$$

Although the above Equations represent a technique that can be utilized to mitigate reverberation in audio data, the technique relies on value(s) for dereverberation, where the value(s) cannot be calculated until the audio data for the entire spoken utterance is received. For example, the technique requires the entire utterance to be obtained before the tap values of Equation 10 can be calculated and, consequently, before dereverberation can be applied. Waiting for audio data for the entire spoken utterance to be obtained can lead to latency in dereverberation, and a resulting latency in use of a dereverberated audio data for ASR and/or other purposes—thereby also causing latency in generating a response from an automated assistant (which can rely on the ASR in generating the response). Further, because a user may be in motion while providing audio, the RIR may change in the middle of an utterance. To allow for an adaptive filter that is adjusted in real-time to allow for continuous processing of an utterance before the utterance has concluded, the technique represented may be adjusted as follows. For each step, the error term is:

$$\xi_l[k] = \sum_{k'=0}^{k} \frac{\alpha^{k-k'}}{\hat{\Lambda}_l^2[k']} |\hat{Y}_l[k']|^2 \text{ where} \quad (10)$$

$$\hat{Y}_l[k] \equiv Y_l[k] - \hat{W}_l[k]^H \tilde{Y}_l[k], \quad (11)$$

$$\hat{W}_l[k] = \min_{w_l[k]} \xi_l[k], \quad (12)$$

and α is a forgetting factor that impacts the speed of adaptation where 0<α≤1. For example, in some implementations a can be between 0.8 and 1.0. Solving Equation 21 for each step, $$\hat{W}_l[k] = R_{\tilde{y}\tilde{y},l}^{-1}[k] P_l[k] \text{ where} \quad (13)$$

$$R_{\tilde{y}\tilde{y},l}[k] \equiv \sum_{k'=0}^{k} \frac{\alpha^{k-k'}}{\hat{\Lambda}_l^2[k']} \tilde{Y}_l[k'] \tilde{Y}_l[k']^H \text{ and} \quad (14)$$

$$P_l[k] \equiv \sum_{k'=0}^{k} \frac{\alpha^{k-k'}}{\hat{\Lambda}_l^2[k']} \tilde{Y}_l[k'] Y_l[k']^H. \quad (15)$$

In Equation 15, $\hat{\Lambda}_l^2[k]$ is the estimate of the received signal power averaged across the M microphones for frame k. This is estimated using a moving average as follows $$\hat{\Lambda}_l^2[k] = \frac{1}{M(r_1 + r_2 + 1)} \sum_{k=-r_1}^{r_2} Y_l[k]^H Y_l[k] \quad (16)$$

where $r_1$ and $r_2$ define the limits of the moving average. Recognizing the recursive relationship $$R_{\tilde{y}\tilde{y},l}[k] = \alpha R_{\tilde{y}\tilde{y},l}[k-1] + \tilde{Y}_l[k] \tilde{Y}_l[k]^H \quad (17)$$

enables the avoidance of taking the inverse of $R_{\tilde{y}\tilde{y},l}[k]$ at each time step by applying the matrix inversion lemma such that $$S_{\tilde{y}\tilde{y},l}[k] \equiv R_{\tilde{y}\tilde{y},l}^{-1}[k] \quad (18)$$

$$= \frac{1}{\alpha} \left[ S_{\tilde{y}\tilde{y},l}(k-1) - K_l[k] Y_l[\tilde{k}]^H S_{\tilde{y}\tilde{y},l}[k-1] \right] \text{ where} \quad (19)$$

$$K_l[k] \equiv \frac{S_{\tilde{y}\tilde{y},l}[k-1] \tilde{Y}_l[k]}{\alpha \hat{\Lambda}_l^2[k] + \tilde{Y}_l[k]^H S_{\tilde{y}\tilde{y},l}[k-1] \tilde{Y}_l[k]} \quad (20)$$

Thus, the tap update equation can be obtained as $$\hat{W}_l[k] = \hat{W}_l[k-1] + K_l[k] \hat{Y}_l^H[k]. \quad (21)$$

The tap values are iteratively updated based on the audio data frames from the audio signals received from a plurality of microphones. Equation 21 can be applied to Equation 10 to generate audio data frames with mitigated reverberation, and the audio data frames. At a given iteration, the filter defined by Equation 21 can be updated based on audio data frames, from multiple microphones, that are earlier in time than the audio data frames being dereverberated, and utilized in Equation 10 to generate reverberation mitigated versions of the audio data frames being dereverberated. This process can be repeated iteratively for each of multiple iterations.

The resulting dereverberated audio data frames have reduced reverberation with the original source signal maintained. The dereverberated audio data may then be provided to one or more components of the automated assistant 110 for further processing. For example, the dereverberated audio data may be provided to the ASR module 132.

Figure 4:
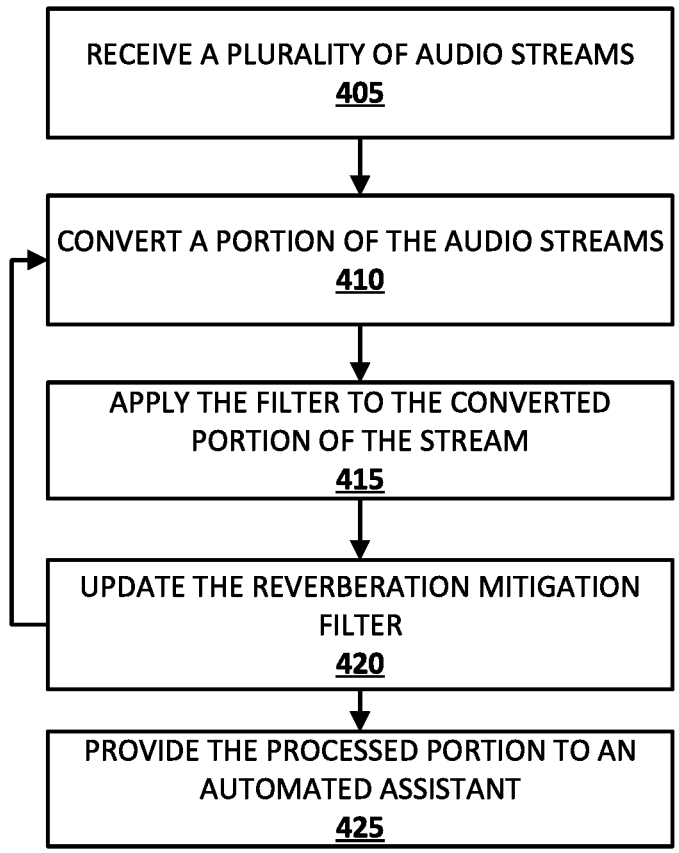
FIG. 4 illustrates a flowchart of an example method of mitigating reverberation according to implementations disclosed herein.

FIG. 4 is a flowchart illustrating an example method of mitigating reverberation according to implementations disclosed herein. The steps of FIG. 4 can be performed by one or more processors, such as one or more processors of a client device. Other implementations may include additional steps than those illustrated in FIG. 4, may perform step(s) of FIG. 4 in a different order and/or in parallel, and/or may omit one or more of the steps of FIG. 4.

Figure 5:
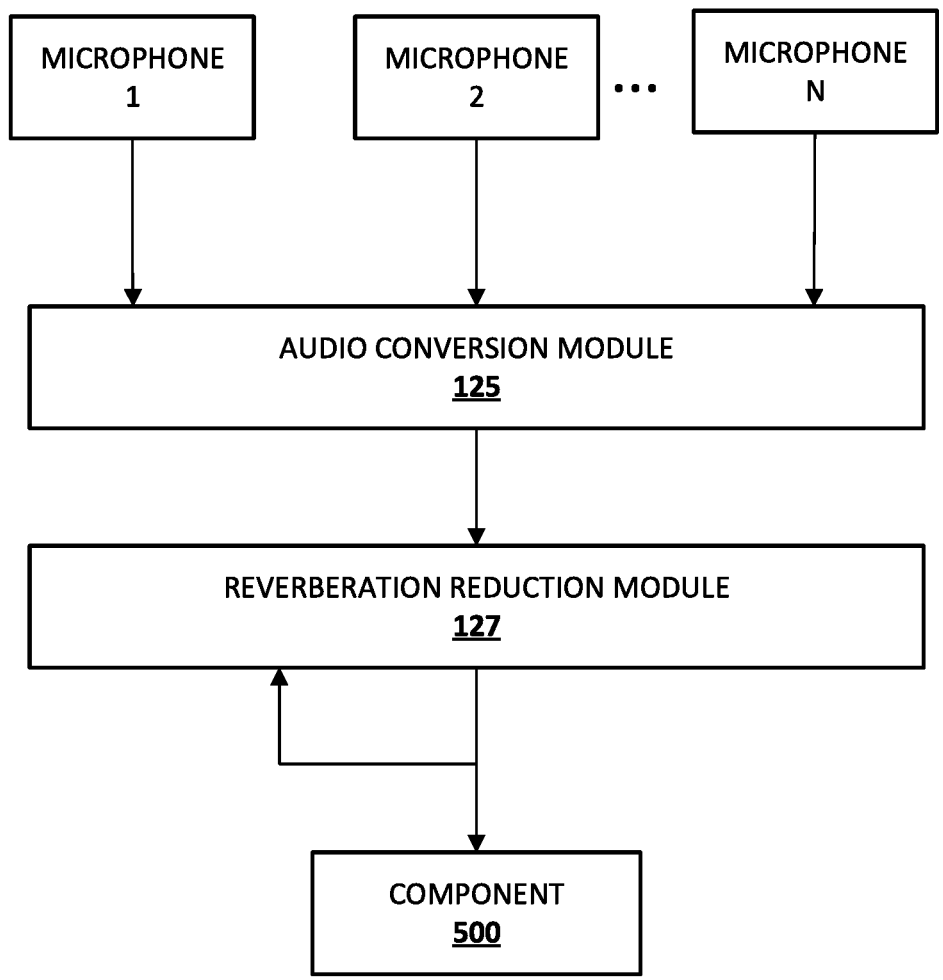
FIG. 5 illustrates an example of mitigating reverberation in audio data for a plurality of microphones.

At step 405, audio signal streams are received from a plurality of microphones. Each of the audio signal streams is based on output from one of the microphones and may reflect, for example, all or portions of a spoken utterance of a user (direct path and/or indirect (reverberated) portion(s)). For example, the microphones may be a component of a client device, such as client device 106, that implements one or more aspects of an automated assistant. The user may utter one or more phrases to invoke or otherwise interact with the automated assistant and the microphones may sense the audio and provide corresponding audio signal streams to one or more components of the automated assistant, such as audio conversion module 125 (FIG. 1). For example, referring to FIG. 5, a flow diagram illustrating the flow of audio data is provided. A plurality of microphones (Microphone 1, Microphone 2, etc.) each provides an audio signal stream to the audio conversion module 125.

At step 410, a portion of each of the audio signal streams is converted into a corresponding frequency domain representation. For example, as described herein, audio conversion module 125 may perform a fast Fourier transform on a portion of each of the audio signal streams. For instance, the audio conversion module 125 can convert a most recent unprocessed portion of an audio signal stream from a first microphone into a corresponding frequency domain representation, can convert a most recent unprocessed portion of an audio signal stream from a second microphone into a corresponding frequency domain representation, and so forth for each of the microphones. In some implementations, conversion of the portion of the audio stream may be performed at the client device 106. In some implementations, conversion may be performed remotely from the client device 106. In some implementations, the portion of converted audio may be stored, such as in a buffer, for subsequent processing and/or for subsequent utilization in updating a reverberation mitigation filter. For example, referring again to FIG. 5, the audio conversion module 125 receives the audio signal streams, and performs a transformation on respective portions of each of the audio signal streams to generate frequency domain representations thereof. The frequency domain representations are provided to the reverberation reduction module 127.

At step 415, an adaptive filter is applied to the current portion of the converted audio stream. The filter may be applied as described herein, resulting in mitigation of reverberation in the processed portion. For example, one or more previous portions of the audio stream may include a portion of an utterance of the user. The current portion may include an additional portion of the utterance and additionally include a reverberation of the previous portion of the utterance. Once the filter has been applied, the reverberation portion is mitigated and the additional portion of the utterance (i.e., the meaningful audio from the portion) is preserved. In some implementations, the processed portion of the audio is stored, such as in a buffer and/or otherwise in memory, for utilization in subsequent updating of the audio stream (i.e., for reverberation mitigation of subsequent portions that include a reverberation of the portion of the utterance spoken in the current portion). Application of the adaptive filter may be performed utilizing one or more equations previously described herein.

At step 420, the adaptive reverberation filter is updated based on one or more prior received and converted portions of an audio signal stream. For example, the adaptive reverberation filter can be updated based on prior corresponding frequency domain representations for the audio signal streams, where the prior corresponding frequency domain representations temporally precede the most recently generated frequency domain representations to which the filter is to be applied. The filter can be updated by a component that shares one or more characteristics with the reverberation reduction module 127. In some implementations, reverberation module 127 can update the filter utilizing a portion of the converted audio signal stream immediately preceding the current portion of the audio stream. In some implementations, reverberation module 127 may utilize portions of the audio stream from at least a threshold number of frames prior to the current portion to update the filter. In some implementations, the update step may be omitted, such as in iterations wherein the first portion of the audio data is being processed and the filter has not been initially generated. Thus, in some implementations, updating the filter may include generating a filter that may then be updated during subsequent iterations of the method.

At step 425, reverberation mitigated audio data is provided to one or more additional components for further processing. For example, the reverberation mitigated audio data may be provided to an ASR component, such as an ASR component that includes a STT component. Because the filter is continuously updated based on new audio stream data being received, the updating and filtering process is iterative. Thus, previously processed portions of the stream, which have been reverberation mitigated, may be utilized to mitigate reverberation in subsequent audio portions. In addition to providing the processed audio to one or more components of the automated assistant, the processed portion is provided to the reverberation reduction module 127 for utilization in subsequent filter updates. For example, referring again to FIG. 5, reverberation reduction module provides the processed signal to component 500 for further processing. Additionally, the processed signal is provided back to the reverberation reduction module to utilize in updating the reverberation mitigation filter on subsequent portions received from audio conversion module 125. In some implementations, the reverberation mitigated audio data can be provided to the one or more additional components before all of the audio data has been converted and filtered (i.e., in real time or near real time). In some implementations, the all audio data for a spoken utterance of the user may be converted and filtered before any of the filtered audio data is provided to one or more additional components.

Figure 6:
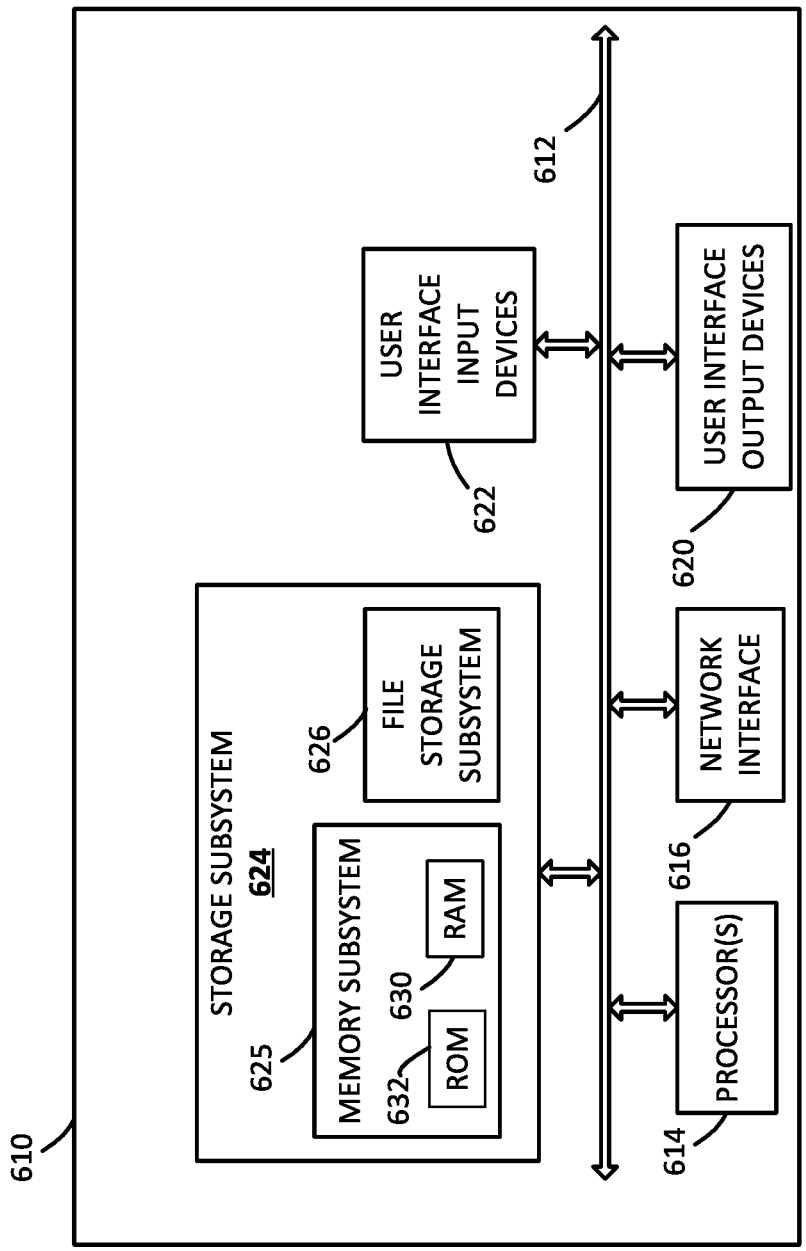
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method described herein, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving a plurality of audio signal streams, wherein each of the audio signal streams is based on output from a corresponding one of a plurality of microphones of a client device;
   at each of a plurality of iterations during a spoken utterance of a user that is detected at the plurality of microphones and that influences the audio signal streams:
      converting most recent unprocessed portions of the audio signal streams into corresponding frequency domain representations;
      updating a multi-microphone adaptive reverberation filter utilizing the corresponding frequency domain representations of the audio signal streams for at least one prior iteration of the plurality of iterations, wherein, at a given iteration, updating the multi-microphone adaptive reverberation filter utilizing the corresponding frequency domain representations of the audio signal streams for at least one prior iteration of the plurality of iterations comprises:
         updating the multi-microphone adaptive reverberation filter utilizing the corresponding frequency domain representations of the audio signal streams for a prior iteration that is at least N iterations prior to the given iteration, and wherein N is greater than one;
      utilizing the updated multi-microphone adaptive reverberation filter in generating reverberation mitigated versions of the corresponding frequency domain representations for the most recent unprocessed portions of the audio signal streams; and
      providing the reverberation mitigated versions of the corresponding frequency domain representations for further processing by at least one additional component.

2. The method of claim 1, wherein converting the most recent unprocessed portions of the audio signal streams into corresponding frequency domain representations comprises applying a fast Fourier transform to each of the unprocessed portions of the audio signal streams to generate the corresponding frequency domain representations of the most recent unprocessed portions of the audio signal streams.

3. The method of claim 2, wherein the corresponding frequency domain representations each comprise corresponding values for a plurality of frequency bins.

4. The method of claim 1, wherein the updated multi-microphone adaptive reverberation filter and the corresponding frequency domain representations for the most recent unprocessed portions of the audio signal streams are each a corresponding matrix, and wherein utilizing the updated multi-microphone adaptive reverberation filter in generating the reverberation mitigated versions of the corresponding frequency domain representations for the most recent unprocessed portions of the audio signal streams comprises:
  generating a conjugate transpose of the multi-microphone adaptive reverberation filter; and
  generating the reverberation mitigated version of the corresponding frequency domain representations for the most recent unprocessed portions of the audio signal streams based on subtracting, from the corresponding frequency domain representations, a given matrix that is based on the conjugate transpose of the multi-microphone adaptive reverberation filter.

5. The method of claim 1, wherein the further processing comprises performing automatic speech recognition and the additional component comprises an automatic speech recognition component.

6. The method of claim 5, wherein in performing the automatic speech recognition, the automatic speech recognition component utilizes the trained acoustic model in processing the reverberation mitigated versions of the corresponding frequency domain representations, for a plurality of the iterations, to generate a semantic representation of the reverberation mitigated versions of the corresponding frequency domain representations, for a plurality of the iterations.

7. The method of claim 6, wherein the trained acoustic model is trained based at least in part on training audio data that is not dereverberated.

8. The method of claim 6, wherein the trained acoustic model is trained based at least in part on training audio data that is dereverberated.

9. A client device, comprising:
  a plurality of microphones; and
  one or more processors configured to:
    receiving a plurality of audio signal streams, wherein each of the audio signal streams is based on output from a corresponding one of the plurality of microphones;
    at each of a plurality of iterations during a spoken utterance of a user that is detected at the plurality of microphones and that influences the audio signal streams:
      convert most recent unprocessed portions of the audio signal streams into corresponding frequency domain representations;
      update a multi-microphone adaptive reverberation filter utilizing the corresponding frequency domain representations of the audio signal streams for at least one prior iteration of the plurality of iterations, wherein, at a given iteration, in updating the multi-microphone adaptive reverberation filter utilizing the corresponding frequency domain representations of the audio signal streams for at least one prior iteration of the plurality of iterations, one or more of the processors are to:
        update the multi-microphone adaptive reverberation filter utilizing the corresponding frequency domain representations of the audio signal streams for a prior iteration that is at least N iterations prior to the given iteration, and wherein N is greater than one;
      utilize the updated multi-microphone adaptive reverberation filter in generating reverberation mitigated versions of the corresponding frequency domain representations for the most recent unprocessed portions of the audio signal streams; and
      provide the reverberation mitigated versions of the corresponding frequency domain representations for further processing by at least one additional component.

10. The client device of claim 9, wherein in converting the most recent unprocessed portions of the audio signal streams into corresponding frequency domain representations one or more of the processors are to apply a fast Fourier transform to each of the unprocessed portions of the audio signal streams to generate the corresponding frequency domain representations of the most recent unprocessed portions of the audio signal streams.

11. The client device of claim 10, wherein the corresponding frequency domain representations each comprise corresponding values for a plurality of frequency bins.

12. The client device of claim 9, wherein the updated multi-microphone adaptive reverberation filter and the corresponding frequency domain representations for the most recent unprocessed portions of the audio signal streams are each a corresponding matrix, and wherein in utilizing the updated multi-microphone adaptive reverberation filter in generating the reverberation mitigated versions of the corresponding frequency domain representations for the most recent unprocessed portions of the audio signal streams, one or more of the processors are to:
  generate a conjugate transpose of the multi-microphone adaptive reverberation filter; and
  generate the reverberation mitigated version of the corresponding frequency domain representations for the most recent unprocessed portions of the audio signal streams based on subtracting, from the corresponding frequency domain representations, a given matrix that is based on the conjugate transpose of the multi-microphone adaptive reverberation filter.

13. The client device of claim 9, wherein the further processing comprises performing automatic speech recognition and the additional component comprises an automatic speech recognition component.

14. The client device of claim 13, wherein in performing the automatic speech recognition, the automatic speech recognition component utilizes the trained acoustic model in processing the reverberation mitigated versions of the corresponding frequency domain representations, for a plurality of the iterations, to generate a semantic representation of the reverberation mitigated versions of the corresponding frequency domain representations, for a plurality of the iterations.

15. The client device of claim 14, wherein the trained acoustic model is trained based at least in part on training audio data that is not dereverberated.

16. The client device of claim 14, wherein the trained acoustic model is trained based at least in part on training audio data that is dereverberated.

* * * * *